US006572691B2

(12) United States Patent
Brown et al.

(10) Patent No.: US 6,572,691 B2
(45) Date of Patent: Jun. 3, 2003

(54) INK COMPOSITIONS AND METHODS OF USE THEREFOR

(75) Inventors: David W. Brown, Ambler, PA (US); Kenneth Breindel, Lansdale, PA (US); Ronald W. Broadbent, Horsham, PA (US); Michael S. Wiggins, Lansdale, PA (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 10/229,723

(22) Filed: Aug. 28, 2002

(65) Prior Publication Data

US 2003/0061966 A1 Apr. 3, 2003

Related U.S. Application Data

(60) Provisional application No. 60/326,302, filed on Oct. 1, 2001.

(51) Int. Cl.$^7$ .................. C09D 11/00; C08F 283/06
(52) U.S. Cl. ................ 106/31.58; 106/31.59; 106/31.86; 106/31.89; 525/404
(58) Field of Search .................. 106/31.58, 31.59, 106/31.86, 31.89; 525/404

(56) References Cited

U.S. PATENT DOCUMENTS

| | | | | |
|---|---|---|---|---|
| 5,827,453 A | * | 10/1998 | Gross et al. | 516/134 |
| 5,877,245 A | * | 3/1999 | Wiggins et al. | 524/366 |
| 5,895,606 A | | 4/1999 | Kudoh et al. | 252/500 |
| 5,985,605 A | * | 11/1999 | Cheng et al. | 800/278 |
| 6,465,605 B2 | * | 10/2002 | Breindel et al. | 528/403 |
| 2001/0027227 A1 | * | 10/2001 | Breindel et al. | 523/400 |
| 2002/0123537 A1 | * | 9/2002 | Dones et al. | 522/170 |
| 2002/0169258 A1 | * | 11/2002 | Wiggins et al. | 525/404 |

* cited by examiner

Primary Examiner—Helene Klemanski
(74) Attorney, Agent, or Firm—John E. Drach; Henry E. Millson, Jr.

(57) ABSTRACT

Ink compositions containing a surfactant-effective and/or defoaming-effective quantity of at least one reaction product comprising the following reactants:

A) at least one compound of formula I $$R^1(X)_3 \qquad (I)$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and B) at least one compound having the formula II $$R^2X(AO)_nY \qquad (II)$$

wherein $R^2$ is a substituted or unsubstituted, saturated or unsaturated, organic group having from 1 to 36 carbon atoms; X is —O—, —S—, or $NR^3{}^3$— where $R^3$ is hydrogen or a $C_1$–$C_{18}$ group; each AO group is independently an ethyleneoxy, 1,2-propyleneoxy, or 1,2-butyleneoxy group, n is a number of from 0 to 200, preferably from 1 to 100, more preferably from 2 to 20; and Y is hydrogen, or Y can be a mercapto group or an amino group in place of a terminal —OH group, provided that when Y is mercapto or an amino group, n is at least 1.

38 Claims, No Drawings

INK COMPOSITIONS AND METHODS OF USE THEREFOR

CROSS-REFERENCE TO RELATED APPLICATIONS

This application claims the benefit of copending provisional application Ser. No. 60/326,302, filed on Oct. 1, 2001, the entire contents of which are incorporated herein by reference.

FIELD OF THE INVENTION

This invention relates to ink compositions and to their methods of use.

BACKGROUND OF THE INVENTION

In the preparation of inks for various uses, the inks must possess good wetting properties, especially when used on low-energy substrates, must penetrate absorbent substrates without creating foam, should have good gloss when dry, must have good performance independent of temperature variations, exhibit low tendency to "sling" during high shear applications, i.e. have good spatter resistance, and any surfactants present must not overemulsify the ink.

SUMMARY OF THE INVENTION

The present invention relates to ink compositions possessing the above attributes, which contain at least one of the following surface-active reaction products, which are the reaction products comprised of the following reactants:

A) at least one compound of formula I

$$R^1(X)_3 \qquad (I)$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and B) at least one compound having the formula II

$$R^2X(AO)_nY \qquad (II)$$

wherein $R^2$ is a substituted or unsubstituted, saturated or unsaturated, organic group having from 1 to 36 carbon atoms; X is —O—, —S—, or $NR^3$— where $R^3$ is hydrogen or a $C_1$–$C_{18}$ alkyl group; each AO group is independently an ethyleneoxy, 1,2-propyleneoxy, or 1,2-butyleneoxy group, n is a number of from 0 to 200, preferably from 1 to 100, more preferably from 2 to 20; and Y is hydrogen, or Y can be a mercapto group or an amino group (amino or $C_1$–$C_6$ alkylamino group) in place of a terminal —OH group, provided that when Y is mercapto or an amino group, n is at least 1.

The mole ratio of the linking compound (I) to (II) is from 0.1:1 to 5:1, preferably from 0.6:1 to 2:1, more preferably from 0.8:1 to 2:1 and most preferably from 1.0:1 to 1.5:1.

This invention also relates to methods for using the ink compositions of the invention.

DETAILED DESCRIPTION

Other than in the operating examples, or where otherwise indicated, all numbers expressing quantities of ingredients or reaction conditions used herein are to be understood as modified in all instances by the term "about".

In the above compounds of component A), the linking compound of formula I is preferably epichlorohydrin or another epihalohydrin. Also, trihaloalkanes can be used, such as 1,2,3-trichloropropane, 1,2,4-trichlorobutane, 1,3,6-trichlorohexane, and the like. Instead of chlorine in the epihalohydrins and the trihaloalkanes, the corresponding bromine and iodine compounds can also be used, including compounds containing two or even all three of the above halogens.

The component B) compounds of formula II are organic (optionally alkoxylated) alcohols or the corresponding sulfhydryl or amine compounds.

The $R^2$ group can be a substituted or unsubstituted, saturated or unsaturated hydrocarbon group having from 1 to 36 carbon atoms. Examples of such hydrocarbon groups include linear or branched alkyl groups having from 1 to 36 carbon atoms, preferably from 4 to 22 carbon atoms, linear or branched alkenyl or alkynyl groups having from 2 to 36 carbon atoms, preferably from 4 to 22 carbon atoms, aryl groups having from 6 to 22 carbon atoms, and arenyl groups having from 7 to 36 carbon atoms. Arenyl groups are alkyl-substituted aromatic radicals having a free valence at an alkyl carbon atom such as a benzylic group.

The $R^2$ group can also be a saturated carbocyclic group, an unsaturated carbocyclic group having one or more multiple bonds, a saturated heterocyclic group, or an unsaturated heterocyclic group having one or more multiple bonds. Any of the above $R^2$ groups can be substituted groups, i.e. the groups can be single or multiple substituents such as one or more halogen substituents, for example Cl, Fl, I, and Br; a sulfur functionality such as a mercaptan or thio group; a nitrogen functionality such as an amine or amide functionality; an alcohol functionality, a silicon functionality, e.g., a siloxane; an ether functionality, e.g. a $C_1$–$C_6$ alkoxy group; or any combination thereof.

The $R^2$ group in formula II is preferably a branched chain alkyl group containing from 4 to 36 carbon atoms, preferably from 4 to 12 carbon atoms, and more preferably from 8 to 10 carbon atoms.

When the X group of formula II is an —S— group, the $R^2$ group will preferably have from about 4 to about 22 carbon atoms, examples of which include but are not limited to, dodecyl mercapto and 1-hexadecanethiol.

When the $R^2X$— group of formula II is a secondary or tertiary amino group, the group preferably contains from 4 to 22 carbon atoms, and n is preferably a number of from 1 to 50. Examples of primary and secondary amines useful for obtaining the $R^2X$— group include, but are not limited to, dibutyl amine, cyclohexyl amine, isodecyl amine, and dioctylamine.

Optionally an additional component C) can be reacted with the linking agent of formula I and the compound of formula II. A glycidyl ether or amine can be added to the reaction of formula I and formula II. The amount of the glycidyl ether or glycidyl amine is from about 1 to about 20 mole percent based on the moles of the compounds of formula II used in reaction. When the glycidyl ether or glycidyl amine is added, the ratio of component A) plus the glycidyl ether or glycidyl amine to component B) is preferably from about 1.2:1 to about 5:1. Examples of glycidyl ethers include, but are not limited to, PEG 600 diglycidyl ether, TETRONIC™ 701 tetraglycidyl ether, triglycidyl di or triethanolamine, polyoxyethylene (POE) 200 tallow amine diglycidyl ether, propoxylated (POP10) trimethylol propane triglycidyl ether, propoxylated (POP7) pentaerythritol tetraglycidyl ether. Examples of glycidyl amines include, but are not limited to, tetraglycidyl 1,6-hexane diamine, tetraglycidyl JEFFAMINE™ EDR-148, and tetraglycidyl isophorone diamine.

When Y in formula II is an amine or sulfhydryl group, the resulting compounds can be readily prepared from the corresponding alcohols wherein the terminal hydroxy group is replaced by an —SH group or by an amine nitrogen. For example, a compound of formula II where Y is —OH can be subjected to a catalyzed ammoniation (with ammonia, or a lower alkylamine) for replacement of the hydroxyl.

In the compounds of formula II, the AO groups when present are preferably all ethyleneoxy groups. However, as stated above, each OA group can be independently an ethyleneoxy (EO), 1,2-propyleneoxy (PO), or 1,2-butyleneoxy (BO) group, i.e. any one or more of such groups can be present, and they can be present in any order, as well as be present in blocks, e.g. compounds of formula III:

$$R^2O(EO)_m(PO)_p(BO)_qH \qquad (III)$$

wherein $R^2$ has the meaning given above, m is a number of from 0 to 100, preferably from 1 to 50, more preferably from 4 to 50, p is a number of from 0 to 50, e.g. from 1 to 50, and q is a number of from 0 to 50, e.g. from 1 to 50. Compounds of formula III in which $R^2$ is a branched chain alkyl group having from 4 to 12 carbon atoms, m is a number of from 2 to 20, and p and q are 0 are preferred.

The degree of hydrophilic and hydrophobic properties of the reaction products of components A) and B) can be readily controlled by controlling the type and number of alkyleneoxy groups in component B). For example, the greater the number of ethylenoxy groups present, the greater the water solubility, while the presence of 1,2-propyleneoxy groups and/or 1,2-butylenoxy groups for example, will decrease water solubility.

In general, the compounds of formula III wherein the sum of n, m, and p is at least 1, and especially at least 2 or 3 are preferred for use herein.

The above reaction products can be prepared by the process disclosed in U.S. Pat. No. 5,827,453, the disclosure of which is expressly incorporated herein by reference.

In general, the component A) and B) (and C if present) reactants are reacted together, preferably in the presence of an inert organic solvent such as toluene that will azeotrope water, and in the presence of a base, such as aqueous sodium hydroxide at a temperature of from 60° to 125° C. Preferably component B) is first mixed with the base and the organic solvent, and water is removed by azeotropic distillation. Then component A) (and C, if present) is slowly added and the reaction continued until the reaction is completed. The reaction mixture is filtered and vacuum stripped to remove the organic solvent.

The above reaction products are readily soluble in other surfactants that might be present in the inks; are both surfactants and defoaming agents; are highly stable yet readily biodegradable; and in addition possess all of the advantages discussed above, i.e. provide the inks with good wetting properties; enable the rapid penetration of absorbent surfaces without creating foam; provide the inks with good gloss when dry; provide good distinction between the image and nonimage in lithographic fountain solutions; exhibit good performance independent of temperature variations; do not overemulsify the inks; and provide the inks with good spatter resistance.

Ink compositions are in either liquid or paste form and contain dyes and/or pigments, and are used for writing or printing.

Writing inks are solutions of colorants, such as iron salts, in water, usually also containing low concentrations of tannic acid or gallic acid.

The most common writing ink is blue-black permanent ink, made by dissolving gallic acid, iron (II) sulfate, and tartaric acid in water. Since the blue-black color is produced only when the ink dries, a dye is usually added to color the ink during writing. In ballpoint inks, the ink is a mixture of paste-like consistency, containing highly concentrated dyes in a nonvolatile solvent, e.g. glycols and other liquids, and surfactants.

Washable inks contain glycerol. Various water-soluble dyes dissolved in water are used for colored inks. Dispersions of carbon black stabilized with a protective colloid are often used for drawing inks. Fountain pen inks retain the fluidity of water.

Indian ink is a solid form of ink made from lamp-black mixed with parchment size or fish glue. Rubbed down in water it produces an intensely black permanent ink, often used for line and wash drawing.

Marking inks are made from solutions of silver and copper compounds, sometimes including aniline.

Printing inks, which are diverse in their composition and uses, are viscous to semisolid suspensions of finely divided pigments in a liquid vehicle such as a drying oil, e.g. heat-bodied linseed oil, or a petroleum solvent such as mineral oil. Carbon black is a pigment usually used in black printing ink. Printing inks contain various additives such as additives for printability and drying speeds. Alkyd, phenolformaldehyde, or other synthetic resins are frequently used as binders; and cobalt, manganese, and lead soaps are added to catalyze the oxidative drying reaction. Some types of inks dry by evaporation of a volatile solvent rather than by oxidation and polymerization of a drying oil or resin.

For colored printing inks, pigments such as iron blue, indigo, chrome yellows, benzidine yellows, lithol reds, and phthalocyanine pigments are used. Use distribution of printing inks is offset 40%, gravure 23%, flexographic 18%, letterpress 9%, screen 4%, other 6%.

Various types of printers include inkjet printers (which can also print in color) which squirt ink through a series of nozzles; dot matrix printers produced by a block of pins which strike the ribbon and make a pattern using many small dots; laser printers which work by transferring tiny ink particles contained in a toner cartridge to paper via a rubber belt, wherein the image is produced by laser on a light-sensitive drum within the printer.

High speed printing is carried out on a rotary press using continuous paper from a roll. The printing forms are prepared flat, using type (text) and blocks (illustrations). A paper-mache "flong" mold is made, again flat. The mold is placed in a casting box that has been bent to a half circle, so that when molten metal is pumped between the flong and the circular backing of the mold a semicircular stereotype plate (stereo for short) is produced. The edges are cleaned up, the white (non-print) areas routed out, the inner side shaved to form a perfect semicircle, and two stereos are fitted around each printing cylinder in the press. This forms a circular printing surface.

Modern photogravure, developed from hand etching, uses photographic techniques to produce copper printing cylinders or plates. Positive prints of the type matter and illustrations are printed photographically onto a gelatin-coated carbon tissue. When developed and laid on a copper sheet this forms an etch-resistant pattern (called a resist), which allows acid or other etching material through the image area, leaving the copper surface untouched in the non-image areas. The etched copper cylinders are then fitted to a high-speed rotary gravure press, which operates in much the same way as a letterpress rotary. Rotary photogravure is widely used for the production of high-quality, large-circulation magazines.

Linotype machines (which cast a whole line of type at a time) continue to be used widely for newspaper production, and the Monotype machine (which casts one letter at a time), with its facility for rapid change from one type style or size to another is still used extensively for book production. But phototypesetting, introduced in a practical form in 1955, is superseding the metal type processes in many fields of printing.

An increasingly large volume and variety of reproduced material are prepared quickly and relatively cheaply in offices all over the world by duplicating and copying processes developed for this purpose.

The ink compositions of the invention, which are of course formulated for the particular use or uses to which they will be put, can be used in place of all of the above inks in which a surfactant and/or defoaming agent is required or is advantageously employed.

In general, the reaction products of the invention are present in the ink compositions in from 0.001 to 20% by weight, preferably from 0.01 to 20% by weight, and more preferably from 1 to 10% by weight, based on the weight of the composition.

The invention will be illustrated but not limited by the following examples.

EXAMPLES

Example 1

A liquid blue-black writing ink composition is prepared by mixing together the following components:

gallic acid—5% by weight iron (II) sulfate—3% by weight tartaric acid—4% by weight reaction product of epichlorohydrin and isodecyl alcohol·4EO—1% by weight water—remainder

Example 2

A viscous printing ink composition is formulated by mixing together the following components:

heat-bodied linseed oil—74.5% by weight carbon black—15% by weight phenol-formaldehyde resin—5% by weight cobalt soap—3% by weight reaction product of epichlorohydrin and isononyl alcohol·6EO—2.5% by weight

What is claimed is:

1. In an ink composition containing a liquid vehicle and a colorant, the improvement wherein the ink contains a surfactant-effective and/or defoaming-effective quantity of at least one reaction product comprising the following reactants:

A) at least one compound of formula I $$R^1(X)_3 \quad (I)$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and B) at least one compound having the formula II $$R^2X(AO)_nY \quad (II)$$

wherein $R^2$ is a substituted or unsubstituted, saturated or unsaturated, organic group having from 1 to 36 carbon atoms; X is —O—, —S—, or $NR^3$— where $R^3$ is hydrogen or a $C_1$–$C_{18}$ group; each AO group is independently an ethyleneoxy, 1,2-propyleneoxy, or 1,2-butyleneoxy group, n is a number of from 0 to 200; and Y is hydrogen, or Y can be a mercapto group or an amino group in place of a terminal —OH group, provided that when Y is mercapto or an amino group, n is at least 1.

2. The ink composition of claim 1 wherein the mole ratio of component A) to component B) is from about 0.1:1 to about 5:1.

3. The ink composition of claim 2 wherein said mole ratio is from about 0.8:1 to about 2:1.

4. The ink composition of claim 2 wherein said mole ratio is from about 1.0:1 to about 1.5:1.

5. The ink composition of claim 1 wherein component A) is epichlorohydrin.

6. The ink composition of claim 1 wherein in formula II, n is a number of from 1 to 100.

7. The ink composition of claim 6 wherein n is a number of from 2 to 20.

8. The ink composition of claim 1 wherein in component B) the $R^2$ group is a straight or branched chain alkyl group.

9. The ink composition of claim 8 wherein in component B) n is a number from 2 to 20.

10. The ink composition of claim 1 wherein component B) has the formula:

$$R^2O(EO)_m(PO)_p(BO)_qH \quad (III)$$

wherein $R^2$ has the meaning given in claim 1, m is a number of from 0 to 100, p is a number of from 0 to 50, and q is a number of from 0 to 50.

11. The ink composition of claim 10 wherein component A) is epichlorohydrin.

12. The ink composition of claim 10 wherein the mole ratio of component A) to component B) is from about 0.1:1 to about 5:1.

13. The ink composition of claim 12 wherein said mole ratio is from about 0.8:1 to about 2:1.

14. The ink composition of claim 12 wherein said mole ratio is from about 1.0:1 to about 1.5:1.

15. The ink composition of claim 10 wherein m is a number of from 2 to 20.

16. The ink composition of claim 15 wherein p and q=0.

17. The ink composition of claim 10 wherein $R^2$ is an alkyl group having from 4 to 12 carbon atoms.

18. The ink composition of claim 17 wherein $R^2$ is a branched alkyl group.

19. The ink composition of claim 10 wherein $R^2$ is an alkyl group having from 4 to 12 carbon atoms, m is a number of from 4 to 50, and p and q=0.

20. The ink composition of claim 19 wherein component B) is isodecyl alcohol·4EO.

21. The ink composition of claim 1 wherein the ink composition is a writing ink composition.

22. The ink composition of claim 1 wherein the ink composition is a printing ink composition.

23. An ink composition comprising:

I) a liquid vehicle;

) at least one colorant; and

) a surfactant-effective and/or defoaming-effective quantity of at least one reaction product comprising the following reactants:

A) at least one compound of formula I $$R^1(X)_3 \tag{I}$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and B) at least one compound having the formula II $$R^2X(AO)_nY \tag{II}$$

wherein $R^2$ is a substituted or unsubstituted, saturated or unsaturated, organic group having from 1 to 36 carbon atoms; X is —O—, —S—, or $NR^3$— where $R^3$ is hydrogen or a $C_1$–$C_{18}$ group; each AO group is independently an ethyleneoxy, 1,2-propyleneoxy, or 1,2-butyleneoxy group, n is a number of from 0 to 200; and Y is hydrogen, or Y can be a mercapto group or an amino group in place of a terminal —OH group, provided that when Y is mercapto or an amino group, n is at least 1.

24. The ink composition of claim 23 wherein the mole ratio of component III) A) to component III) B) is from about 0.1:1 to about 5:1.

25. The ink composition of claim 24 wherein said mole ratio is from about 0.8:1 to about 2:1.

26. The ink composition of claim 23 wherein component III) B) has the formula:

$$R^2O(EO)_m(PO)_p(BO)_qH \tag{III}$$

wherein $R^2$ has the meaning given in claim 1, m is a number of from 0 to 100, p is a number of from 0 to 50, and q is a number of from 0 to 50.

27. The ink composition of claim 26 wherein component III) A) is epichlorohydrin.

28. The ink composition of claim 26 wherein the mole ratio of component III) A) to component III) B) is from about 0.1:1 to about 5:1.

29. The ink composition of claim 28 wherein said mole ratio is from about 0.8:1 to about 2:1.

30. The ink composition of claim 28 wherein said mole ratio is from about 1.0:1 to about 1.5:1.

31. The ink composition of claim 26 wherein m is a number of from 2 to 20.

32. The ink composition of claim 31 wherein p and q=0.

33. The ink composition of claim 26 wherein $R^2$ is an alkyl group having from 4 to 12 carbon atoms.

34. The ink composition of claim 33 wherein $R^2$ is a branched alkyl group.

35. The ink composition of claim 26 wherein $R^2$ is an alkyl group having from 4 to 12 carbon atoms, m is a number of from 4 to 50, and p and q=0.

36. The ink composition of claim 35 wherein component III) B) is isodecyl alcohol·4EO.

37. The ink composition of claim 26 wherein the ink composition is a writing ink composition.

38. The ink composition of claim 26 wherein the ink composition is a printing ink composition.

* * * * *